(12) United States Patent
Artamo et al.

(10) Patent No.: US 9,874,401 B2
(45) Date of Patent: Jan. 23, 2018

(54) VERTICAL STRAIGHT TUBE COUNTERCURRENT CONDENSER

(71) Applicant: Rinheat Oy, Espoo (FI)

(72) Inventors: Arvi Artamo, Veikkola (FI); Pentti Juhola, Espoo (FI)

(73) Assignee: Rinheat Oy, Espoo (FI)

( * ) Notice: Subject to any disclaimer, the term of this patent is extended or adjusted under 35 U.S.C. 154(b) by 0 days.

(21) Appl. No.: 15/109,660

(22) PCT Filed: Jan. 5, 2015

(86) PCT No.: PCT/FI2015/050004
§ 371 (c)(1),
(2) Date: Jul. 5, 2016

(87) PCT Pub. No.: WO2015/104455
PCT Pub. Date: Jul. 16, 2015

(65) Prior Publication Data
US 2016/0327341 A1    Nov. 10, 2016

(30) Foreign Application Priority Data

Jan. 7, 2014 (EP) ..................................... 14397502

(51) Int. Cl.
| | |
|---|---|
| *B01D 1/06* | (2006.01) |
| *F28B 1/02* | (2006.01) |
| *F28B 9/10* | (2006.01) |
| *F28D 7/10* | (2006.01) |
| *B01D 5/00* | (2006.01) |

(52) U.S. Cl.
CPC ............... *F28B 1/02* (2013.01); *B01D 1/065* (2013.01); *B01D 5/0012* (2013.01); *F28B 9/10* (2013.01); *F28D 7/103* (2013.01)

(58) Field of Classification Search
CPC ......... B01D 1/065; B01D 5/0012; F28B 9/10; F28B 1/02; F28D 7/103
See application file for complete search history.

(56) References Cited

U.S. PATENT DOCUMENTS

| | | | |
|---|---|---|---|
| 1,637,558 A | 8/1927 | Doyle | |
| 2,310,234 A * | 2/1943 | Haug | ........................ F28B 1/02 |
| | | | 165/110 |

(Continued)

FOREIGN PATENT DOCUMENTS

| | | |
|---|---|---|
| CN | 86200767 U | 6/1987 |
| CN | 2354103 Y | 12/1999 |

(Continued)

*Primary Examiner* — Jonathan Miller
(74) *Attorney, Agent, or Firm* — Seppo Laine Oy

(57) ABSTRACT

The subject of the disclosure is a vertical shell and tube straight tube countercurrent condenser, wherein the condensing steam flows on the shell side of the condenser, and the cooling water on the tube side. The disclosure is characterized in that the countercurrent condenser is two pass on both the shell side and the tube side, whereby the heat surface of the first pass on the shell side is formed from heat surface tubes in the steam space of this pass attached at their upper end to an upper tube sheet and at their lower end to a lower tube sheet through which tubes cooling water of second pass on tube-side flows; and the heat surface of the second pass on the shell side is formed from heat surface tubes in steam space of this pass and attached at their upper end to the upper tube sheet and at their lower end to another lower tube sheet, through which tubes cooling water of first pass on tube-side flows, whereby said steam spaces are interconnected through an opening between the upper end of a separating wall, dividing the shell space, and an upper tube sheet; whereby the flow direction of the steam in the steam space of the shell side first pass is upwards; and in the other steam space downwards, and the flow direction of the cooling water in the heat surface tubes of both passes is countercurrent to the steam flow flowing outside said tubes.

11 Claims, 4 Drawing Sheets

(56) References Cited

U.S. PATENT DOCUMENTS

| | | | | |
|---|---|---|---|---|
| 3,180,405 | A * | 4/1965 | Hinde | F25B 39/04 |
| | | | | 165/117 |
| 3,407,873 | A | 10/1968 | Ryall | |
| 3,820,582 | A * | 6/1974 | Ronnholm | B01D 1/26 |
| | | | | 159/13.2 |
| 4,810,327 | A * | 3/1989 | Norrmen | B01D 1/065 |
| | | | | 159/13.3 |
| 5,853,549 | A * | 12/1998 | Sephton | B01D 1/065 |
| | | | | 159/13.2 |
| 6,656,327 | B2 * | 12/2003 | Salmisuo | B01D 1/065 |
| | | | | 122/491 |
| 7,422,663 | B2 * | 9/2008 | Costa | B01D 1/04 |
| | | | | 159/14 |
| 8,603,301 | B2 * | 12/2013 | Heins | B01D 1/065 |
| | | | | 159/47.3 |
| 9,322,599 | B2 * | 4/2016 | Catelli | F28D 7/1638 |
| 2013/0092328 | A1 * | 4/2013 | Catelli | F28D 7/1638 |
| | | | | 159/13.2 |

FOREIGN PATENT DOCUMENTS

| | | | | |
|---|---|---|---|---|
| DE | 3822184 | C1 | 2/1990 | |
| EP | 2433689 | A1 | 3/2012 | |
| EP | 2469215 | A1 * | 6/2012 | F28D 7/16 |
| FR | 1490930 | A | 8/1967 | |
| GB | 661863 | A | 11/1951 | |
| JP | 2009002506 | A | 1/2009 | |

\* cited by examiner

VERTICAL STRAIGHT TUBE COUNTERCURRENT CONDENSER

BACKGROUND

The subject of the invention is a vertical shell and tube straight tube countercurrent condenser for operation at subatmospheric pressures, wherein the condensing steam flows on the shell side of the condenser, and the cooling water on the tube side.

SUMMARY OF THE DISCLOSURE

Tube type condensers in current use are commonly comprised of separate primary and secondary condensers connected in series. The condensers are of a horizontal or vertical design, the steam flowing on the shell side and the cooling water on the tube side. The shell side of the condensers is usually single pass and the tube side is 3- to 6-pass. Venting steam flows, which contain the most non-condensable components, are usually conducted directly to the secondary condenser. The primary condenser condenses about 80% and the secondary condenser about 20% of the condensing steam. Condensate obtained from the primary condenser can normally be reused in the process as, for example, washing water. The "foul condensate" from the secondary condenser must be further purified by stripping.

One objective in the condenser according to the invention is to obtain from the condenser a maximal amount of condensate which is free of methanol and organic sulfur compounds to the extent that it can be reused without a separate stripping stage.

This objective is met using a countercurrent condenser which is characterized by the countercurrent condenser being two-pass on both the shell side and the tube side, whereby the heat surface of the first pass on the shell side is formed from heat surface tubes attached at their upper end to an upper tube sheet and at their lower end to a lower tube sheet; and the heat surface of the second pass on the shell side is formed from heat surface tubes attached at their upper end to the upper tube sheet and at their lower end to another lower tube sheet, whereby the steam spaces of the first and second passes are interconnected by means of an opening between the upper end of a separating wall dividing the shell space and an upper tube sheet; whereby the flow direction of the steam in the steam space of the first pass, in which space the main condensation of steam occurs, is upwards, stripping the counter-flowing condensate downward stream which has been formed from the steam; and it is countercurrent to the tube-side second pass cooling water flow, which appears as a falling film on the inner surface of the heat surface tubes at essentially normal pressure; and in the shell-side second-pass steam space the steam flow is downwards, countercurrent to the first-pass cooling water stream which is upwards inside the tubes.

The condenser which is the subject of the invention is developed as a final condenser for serial evaporators in the pulp industry, but it can be applied for other industrial purposes as well. Final condensers always operate at a pressure below atmospheric and serve to condense, in addition to the main steam flow from the final evaporating effect, steam flows from various flashing and venting operations. In addition to water vapor, the steam flows contain varying amounts of methanol, organic sulfur compounds, gases that have been dissolved in the evaporated black liquors and liberated; and air which has leaked into the equipment.

In the first pass of the shell side of the condenser, the steam flows upwards—countercurrent to the falling cooling water film on the tube side—and condenses on the outer surface of the heat surface tubes. The condensate flows downwards counter to the steam flow. The down-flowing condensate effectively removes any superheating of the steam, cleans the heat surface and prevents heat surface-fouling particles from sticking to the heat surface. The steam prevents the condensate from subcooling and effectively purifies the condensate by stripping. Due to the large contact surface and effective mixing of the evenly distributed flow of steam and condensate, the composition of the leaving condensate is nearly in equilibrium with the composition of the entering steam—the purer the steam, the purer is the condensate.

If steams of varying composition are intermixed before they are conducted to the condenser, the quality of the main steam flow from the first shell side pass decreases.

To remove this problem, each steam flow can be separately introduced to a condenser according to the invention, and at different height levels of the first shell pass so, that the purest steam is introduced at the lowest level and other steams at a level where the composition of the condensing steam corresponds to the composition of the steam introduced to the condenser at the higher level.

By using, in the shell side first pass, cooling where the cooling water flows on the tube side only as a film on the inner surface of the tubes, significant advantages are gained, such as the tube side can operate at normal atmospheric pressure
only a single tube pass is required
direct countercurrent flow between heating and cooling streams
maximal temperature difference between the streams
good heat transfer
minor head loss on the tube side
heat surface tubes having greater diameter and length can be used
lighter and more economical structure According to an embodiment of the invention, the heat surface tubes of the second shell side pass are located in the center of the condenser and they are surrounded by an intermediate wall in the form of a shell. In particular in large condensers, it is advantageous to attach the upper end of the inner shell to the upper tube sheet. With this design, it is possible to make the upper and lower tube plates thinner, stiffen the large tube bundle and make it easier to assemble. Thereby openings for steam flow may be cut in the upper end of the inner cylindrical shell, the openings being evenly distributed over the free periphery. Alternatively, the fastening of the inner cylindrical jacket may be carried out using intermediate, welded rods.

The heat surface tubes are preferably supported by support and baffle grids allowing axial flow, as disclosed in International Patent Application No. WO2012/085337.

To enhance the heat transfer of the second tube pass, a blower is preferably provided in the top of the condenser, said blower being arranged to blow air through the heat surface tubes of the tube side second pass, in the flow direction of the cooling water.

The heat surface tubes of the tube side first pass are longer than the heat surface tubes of the tube side second pass and their lower tube sheet is situated lower than the lower tube sheet of the tube side second pass, and in the intermediate wall surrounding the tube side first pass heat surface tubes there is a bellows in the section between these lower tube sheets, which bellows compensates for the difference in heat expansion which is due to the difference both in length and in temperature between the heat surface tubes of the first and second pass.

Cooling water may also be recycled in both the first and the second tube side pass, or only in either of these. In particular in Nordic conditions where the temperature of natural waters used for cooling varies greatly between the winter and summer periods, it is often advantageous to standardize conditions by recycling cooling water having a higher temperature from the exit side to heat the incoming, colder cooling water stream.

Between the outer shell surrounding the shell side first pass steam space and the second inner shell extending into it there is an annular space through which at least the main steam flow can be conducted to the lower part of the shell side first pass steam space, above the lower tube sheet, from essentially the whole free periphery of the steam space.

In the outer shells of the condenser are steam feed nozzles and rings at least at two different levels for feeding steam of various purity grades.

Below the steam feed nozzle, in the annular space between the bundle of heat surface tubes of the shell side first pass and the shell, can be provided an annular plate and another steam supply nozzle for feeding purer steam into the condenser.

In the condensate space at the bottom end of the shell side first pass steam space, mass transfer devices like valve trays can be provided, and below these a feed nozzle for cleaner stripping steam.

BRIEF DESCRIPTION OF THE DRAWINGS

In the following, the invention is disclosed in greater detail with reference to the attached drawings, in which.

DETAILED DESCRIPTION

Figure 1:
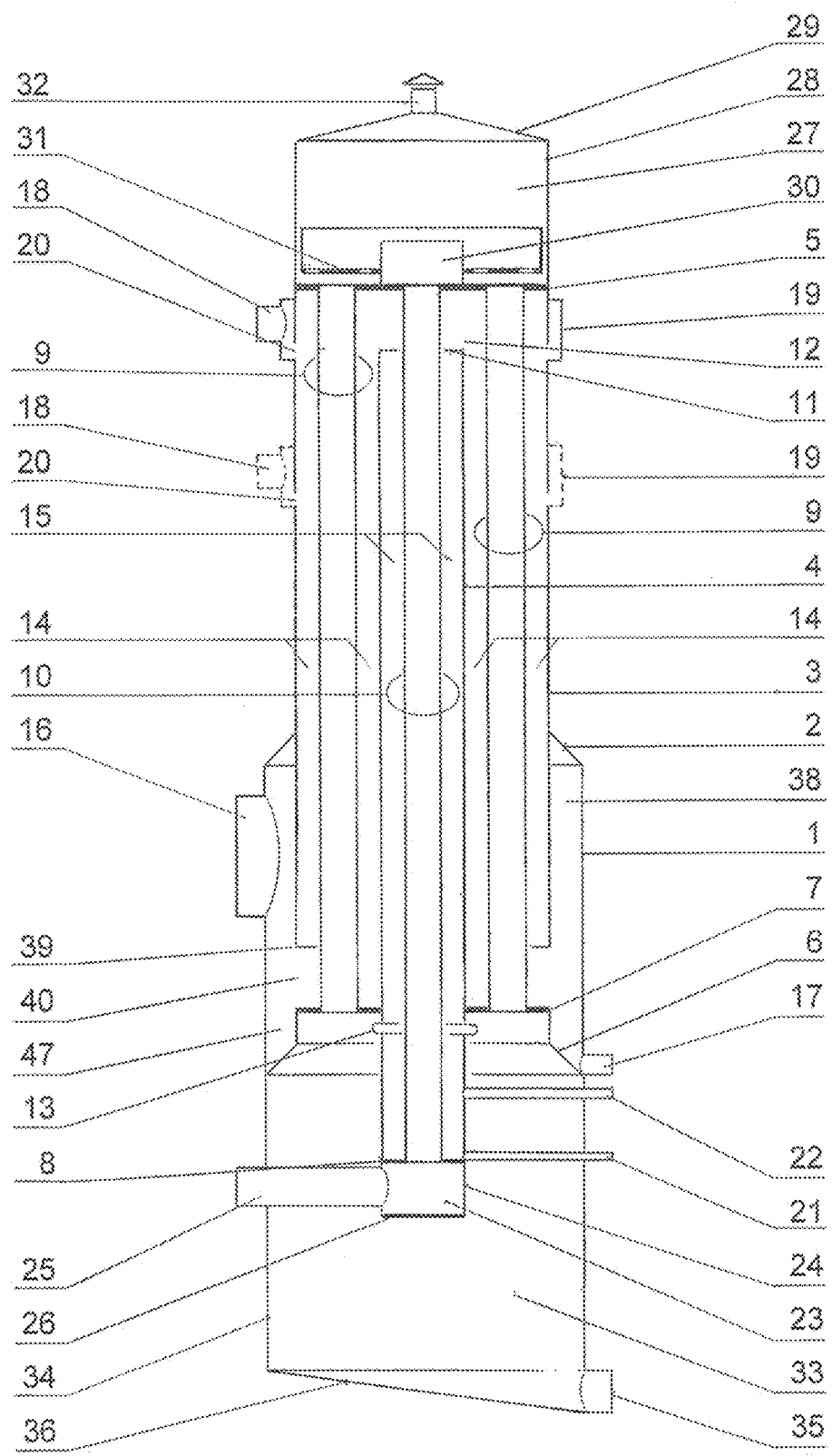
FIG. 1 shows a longitudinal section of a condenser according to the present invention.

The two-pass shell side of the condenser is formed of an outer cylindrical shell 1, at the upper end of which is a conical part 2 connecting it to a second, longer cylindrical shell 3, whose lower end extends into the said outer cylindrical shell 1; and a cylindrical shell 4 of a smaller diameter, situated centrally inside this second cylindrical shell 3; an upper tube sheet 5 attached to shell 3 and a lower tube sheet 7 attached to shell 1 through a cylindrical/conical part 6, and a smaller tube sheet 8 attached to the lower end of the smaller shell 4. Alternatively, as shown in FIG. 4b, the cylindrical shell 4 can be replaced by two walls 50, the outer edges of which are attached to shell 3 and the inner edges of which are attached to each other in a sector fashion, whereas their lower edges can be attached to tube sheet 7.

In the embodiments of FIGS. 1 to 4a, the heat surface of the condenser shell side first pass is formed of heat surface tubes 9 which are located in the annular steam space 14 between cylindrical shells 3 and 4 and are fastened by their ends to tube sheets 5 and 7. The heat surface of the condenser shell side second pass is formed of heat surface tubes 10, located in steam space 15 inside cylindrical shell 4 and connected at their ends to tube sheets 5 and 8.

In shell 4, in the area between tube sheets 7 and 8, bellows 13 is provided to compensate the difference in longitudinal thermal expansion which is due to the differences in both length and temperature between tubes 9 and 10. Between tube sheet 5 and the top 11 of shell 4 is opening 12, which allows an open communication between the shell side first and second pass steam spaces 14 and 15. To cylindrical shell 1 is connected steam feed nozzle 16 and at the very low end of steam space 14 of the shell side first pass is connected a condensate exit nozzle 17. Another steam nozzle 18 is connected to the box ring 19 which surrounds shell 3 and communicates with the shell first pass steam space 14 by means of openings 20. The condensate exit tube 21 is connected to the lower part of shell 4, and the exit tube 22 for non-condensable gases is connected to the shell 4 above the condensate exit tube 21.

Below tube sheet 8 is fastened cylindrical shell 24 and to the lower end of this is fastened the end plate 26; together these form the end chamber 23 of the entry side in the first pass, to which chamber cooling water can be fed through inlet tube 25. Cylindrical shell 28, which forms an extension of cylindrical shell 3 above the upper tube sheet 5, together with the conical and of the condenser form the tube side upper end chamber 27, in which the distribution trough 30 for liquid to be evaporated is situated as well as liquid distributor tray 31. In the embodiment according to FIG. 1, the end cone features nozzle 32, through which the upper end chamber communicates freely with the ambient air. The cylindrical shell 34 below the cylinder/cone section 6, forming an extension of cylindrical shell 1, together with the condenser bottom plate form the tube side lower end chamber 33, in the lowest point of which water exit nozzle 35 is provided.

The main steam flow due for condensing is conducted into the condenser through steam nozzle 16. The annular space 38 between cylindrical shells 1 and 3 distributes the steam to flow evenly from space 40 between the lower edge 39 of cylindrical shell 3 and the tube sheet 7 to the outer periphery of the lower part of the first pass steam space 14. The steam flowing upwards condenses on the outer surface of heat surface tubes 9 and the condensate flows down, counter to the steam flow, removing any superheating. The steam prevents subcooling of the condensate and strips lighter components dissolved in the condensate, like methanol. The condensate flows down onto tube plate 7 and further into condensate space 47 formed by shell 1 and cylinder/cone section 6, and from the condensate space it is conducted out of the device through condensate exit nozzle 17.

Steam flows containing more methanol and organic sulfur compounds can be conducted through nozzles 18, located at a higher point in the condenser, and the corresponding box rings 19 to the outer periphery of steam space 14. The part of the steam flow which has not condensed in the shell side first pass is conducted through opening 12 between the upper edge 11 of cylindrical shell 4 and the tube sheet 5 into the shell side second pass steam space 15, in which the steam flows downwards, cooling and condensing on the outer surface of heat tubes 10. The formed condensate flows into the lower part of shell 4 and is conducted out of the condenser through condensate exit tube 21 above tube sheet 8. The part of the steam flow which has not condensed is conducted out of the condenser through exit tube 22 above condensate exit tube 21.

Cooling water is conducted through feed tube 25 into the tube side first pass end chamber 23, which distributes the water to an upward flow in heat surface tubes 10, countercurrent relative to the downflow of condensate on the outer surface of the tubes. The cooling water flows through the heat surface tubes 10 to the distribution trough 30 above the tube sheet 5, which trough distributes the cooling water as an overflow to distribution tray 31, whose task is the distribution of distribute the cooling water as a uniform stream to all of the tube side second pass heat surface tubes 9, in which it flows as a falling film countercurrent to the condensing steam flowing on the shell side. From heat surface tubes 9, the water flows into the tube side low end chamber 33, from where it is conducted out through water exit nozzle 35.

If the heat surface of the shell side second pass/tube side first pass/number of heat surface tubes 10 is very sparsely dimensioned in relation to a large flow of cooling water, it is possible to
  increase the diameter of heat surface tubes 10,
  allow part of the cooling water flow to bypass the heat surface tubes 10 directly into the cooling water distribution trough 30 in upper end chamber 27.

Correspondingly, if a larger heat surface and more heat surface tubes 10 are required, it is possible to
  decrease the diameter of heat surface tubes 10,
  use extended-surface tubes.

Figure 2:
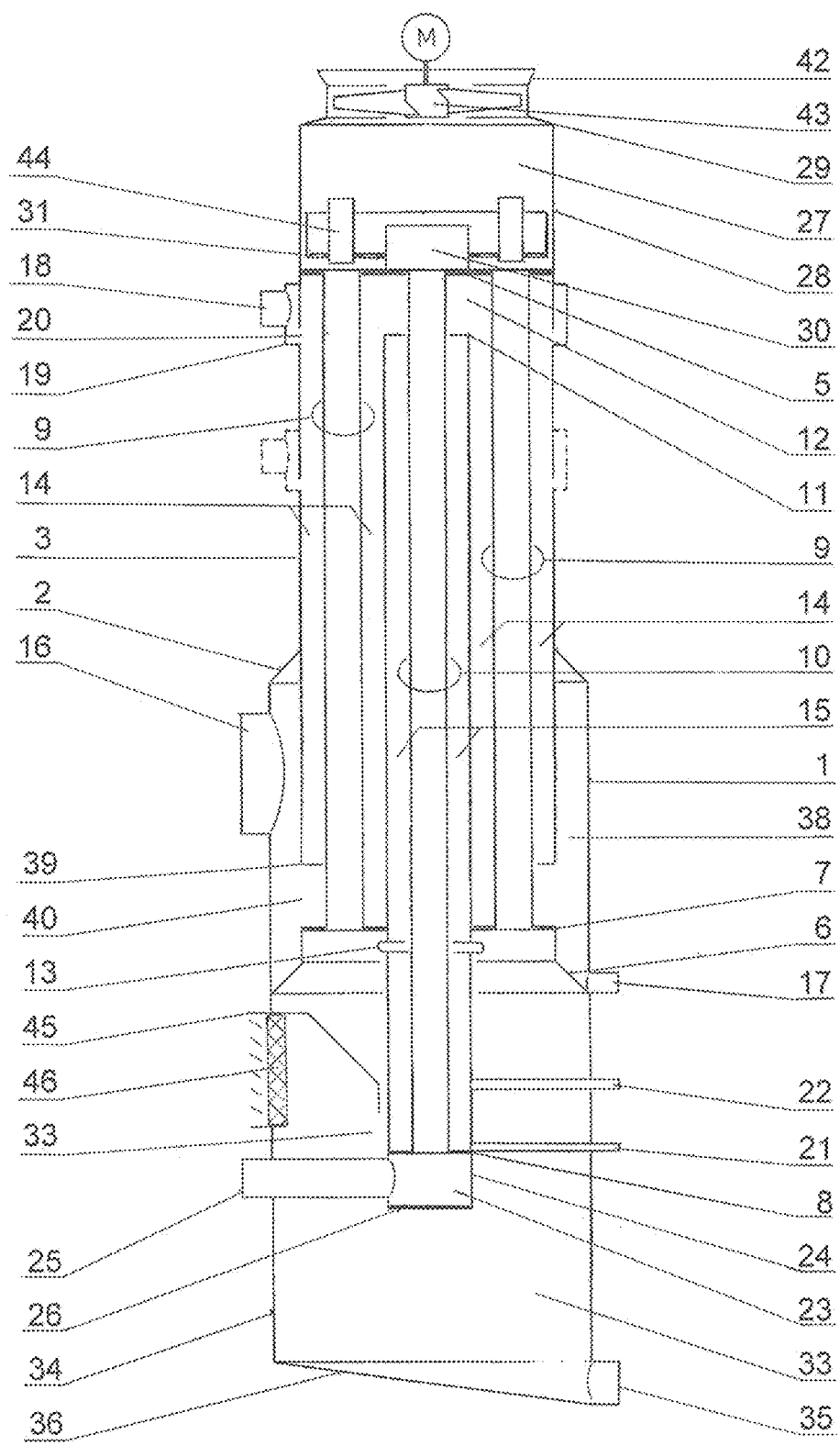
FIG. 2 shows a longitudinal section of another embodiment of a condenser according to the present invention.

The embodiment of a condenser according to the invention shown in FIG. 2, in which the heat transfer in the tube side second pass can be enhanced by blowing air downwards through the heat surface tubes 9 together with the cooling water. For this purpose, an axial blower is provided in nozzle 42 of end cone 29, which blower is arranged to take in ambient air and blow it into upper end chamber 27, from which the air is individually guided into heat surface tubes 9 through tubes 44 connected to liquid distribution tray 31.

The air, which travels faster than the film flowing down the wall of heat surface tubes 9, also increases the flow velocity of the water film, decreases the thickness of the film and increases turbulence, thereby enhancing the heat transfer on the cooling water side. The water and the air flow from the heat surface tubes 9 into the lower end chamber 33 where they separate and the air is discharged through the demister 46 adapted to exit nozzle 45.

By means of the air stream, the need for cooling water can be diminished by 15 to 25%, since the air cools the water by evaporation, as in a cooling tower. If the amount of cooling water is not decreased, the water temperature rises correspondingly less due to the air stream, whereby the temperature difference available for heat transfer increases along with the condensing capacity of the condenser.

During the condensation operation, the pressure loss in the steam flow lowers the condensing temperature of the steam and always decreases the temperature difference available for heat transfer, increasing the need for heat transfer area. In a condenser according to the invention, the feed of steam to the condenser can always occur along the whole periphery of the tube bundle, whereby the area of flux is large and the flow velocity can be kept low from a pressure loss point of view. The steam flow in the shell side steam spaces is mainly axial, which makes possible the use of baffle/support grids as disclosed in e.g. International Patent Application No. WO2012/085337 for supporting long heat surface tubes. As the primary and secondary condensers are combined in the same device according to the invention, the interconnecting tubing causing pressure loss between devices is also eliminated.

In addition to the minor pressure loss, the flow arrangements within the shell side ensure that no dead regions from a heat transfer view are present in the condenser.

A condenser according to the invention is two pass on both sides, and the condensing steam and the warming cooling water flow countercurrent to each other, which from a heat transfer perspective provides the largest temperature difference and makes possible the cooling/condensing of a steam flow containing possible noncondensables to as low a final temperature as possible.

Figure 3:
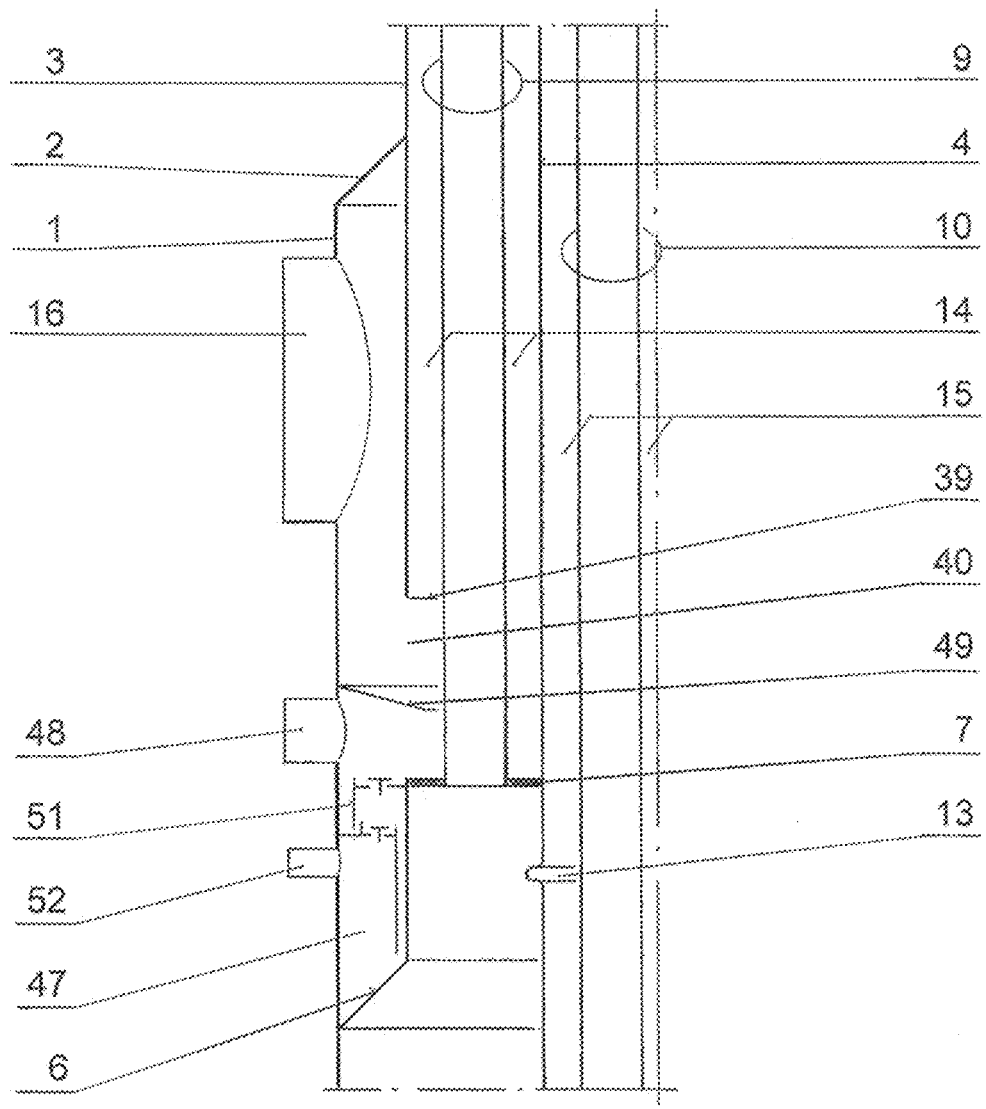
FIG. 3 shows structural details of a third embodiment of a condenser according to the present invention.

In FIG. 3 are shown structural details in a condenser according to the invention, for enhancing the stripping of condensate within the condenser. Below the main steam nozzle 16 of the condenser shown is located another steam nozzle 48 which is placed below the annular plate 49 provided in the space between shell 1 and the tube bundle formed by heat surface tubes 9. Through this steam nozzle 48 is conducted a steam flow, which is cleaner than the steam flow entering through the main steam nozzle 19, into the annular space below the annular plate 49, between shell 1 and the tube bundle, from which annular space the steam flows into steam space 14 between tubes 9. The upflowing steam condenses, preventing the cooling of the less pure condensate which has formed from the steam conducted into the condenser through nozzle 16 and is flowing down along the outer surfaces of tubes 9, and effectively purifying it by stripping.

In the same FIG. 3 is also shown a design in which two valve trays 51 and a feed nozzle 52 for cleaner stripping steam have been provided in the upper part 47 of the condensate space, above the condensate level, of a condenser according to the invention for purifying, by stripping, the condensate formed from the steam fed from the upper steam nozzles (16, 18) in the first pass of the shell side.

Figure 4A:
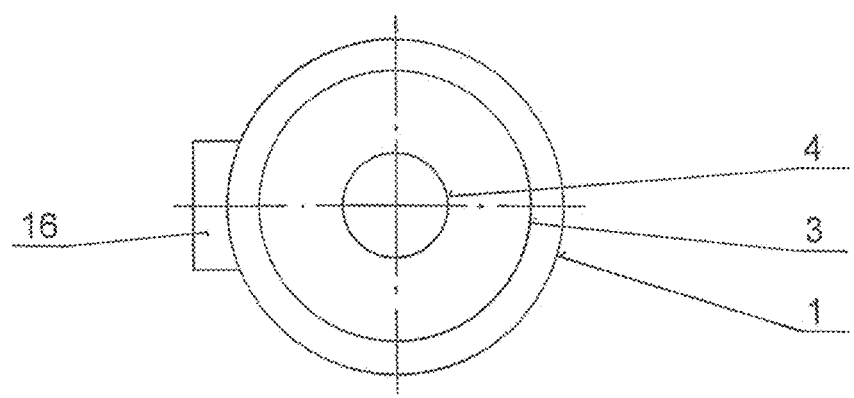
FIGS. 4a and 4b show two examples of the placement of shell/tube passes in a condenser.
Figure 4B:
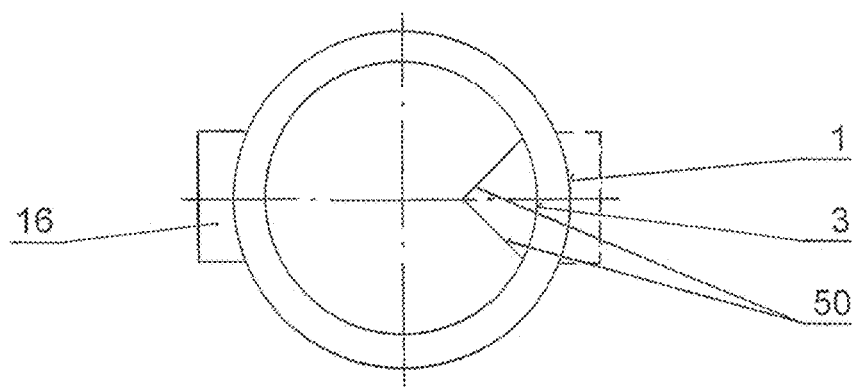
Figure 5:
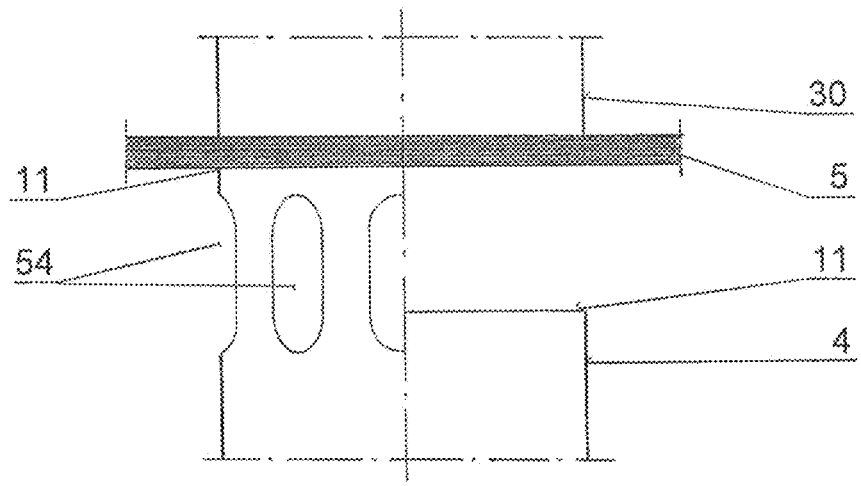
FIG. 5 shows two alternative designs for the upper part of the condenser intermediate wall.

In FIGS. 1 and 2, the tube side first pass tube bundle inside cylindrical shell 4 is located as shown in FIG. 4a in the center of the tube side second pass tube bundle and the shell 3. In FIG. 4b is shown a design in which the first pass tube bundle is located in a sector configuration sideways relative to the tube side second pass and shell 3. In this case, tube sheet 8 can be part of tube sheet 7, whereby also condensate exit nozzle 21 and exit nozzle 22 for non-condensable gases are located above tube sheet 7. The round shell 4 between the shell side passes is then replaced by two walls 50, whose inner edges are attached to each other, the outer edges to shell 3 and the bottom edges to tube sheet 7. FIG. 5 on the left side shows a design in which the cylindrical intermediate wall 4 is attached to the upper tube sheet 5, whereby evenly spaced openings 54 are provided in the upper part of cylindrical intermediate wall 4 to allow a flow of steam.

The invention claimed is:

1. A vertical jacketed straight tube countercurrent condenser for operation at sub-atmospheric pressures, wherein condensing steam flows on the shell side of the condenser and cooling water on the tube side, wherein the countercurrent condenser is two pass on both the shell side and the tube side, whereby a heat surface of the first pass on the shell side is formed from heat surface tubes attached at their upper end to an upper tube sheet and at their lower end to a lower tube sheet; and the heat surface of the second pass on the shell side is formed from heat surface tubes attached at their upper end to the upper tube sheet and at their lower end to either the lower tube sheet or to a separate lower tube sheet, whereby steam spaces of the shell side first and second passes are interconnected by an opening or openings between an upper end of a separating wall dividing the shell space and the upper tube sheet; whereby the flow direction of the steam in the steam space of the shell side first pass, in which space the main condensation of steam occurs, is upwards, stripping a counter-flowing condensate downward stream which has been formed from condensing steam; and the first-pass steam flow is countercurrent to the tube-side second pass cooling water flow, which appears as a falling film on the inner surface of the heat surface tubes at essentially normal pressure; and in the shell-side second-pass steam space the steam flow is downwards, countercurrent to the first-pass cooling water stream which is upwards inside the heat surface tubes: the condenser being provided with a condensate exit at the low end of the shell side first pass, a condensate exit at the lower part of the shell side second pass, and an exit for noncondensable gases above the condensate exit on the shell side second pass.

2. The countercurrent condenser according to claim 1, wherein the shell side second pass heat surface tubes are located in the center of the condenser and they are surrounded by a separating wall forming a shell.

3. The countercurrent condenser according to claim 2, wherein the intermediate wall is attached to the upper tube sheet either directly, whereby evenly spaced openings are provided at the upper end of the shell, or by rods welded between the upper part of the intermediate wall and the upper tube sheet.

4. The countercurrent condenser according to claim 1, wherein the heat surface tubes are supported by support and baffle grids allowing flow in the longitudinal direction of the condenser.

5. The countercurrent condenser according to claim 1, wherein a blower is provided at the upper end of the condenser, the blower being arranged for blowing air through the heat surface tubes of the tube side second pass, in the flow direction of the cooling water.

6. The countercurrent condenser according to claim 2, wherein the heat surface tubes of the tube side first pass are longer than the heat surface tubes of the tube side second pass, and the lower tube sheet of the heat surface tubes of the tube side first pass is situated lower than the lower tube sheet of the heat surface tubes of the tube side second pass, and a bellows is provided in the intermediate wall surrounding the heat surface tubes of the tube side first pass, in the part between the lower tube sheets.

7. The countercurrent condenser according to claim 1, wherein cooling water can be recycled from either the tube side first pass, the tube side second pass or both, from the respective exit side to the respective feed side.

8. The countercurrent condenser according to claim 2, wherein between a first outer shell surrounding the shell side first pass steam space and a second outer shell extending into the shell side first pass steam space, an annular space is provided through which at least a main steam flow can be conducted to the lower part of the shell side first pass steam space, above the lower tube sheet.

9. The countercurrent condenser according to claim 8, wherein steam feed nozzles and box rings are provided at least at two levels in the first outer shell and the second outer shell of the condenser.

10. The countercurrent condenser according to claim 9, wherein below a main steam feed nozzle situated in the annular space between the bundle of heat surface tubes of the shell side first pass and the first outer shell are provided an annular plate and another steam nozzle.

11. The countercurrent condenser according to claim 1, wherein in the condensate spaced at the bottom end of the shell side first pass steam space valve trays are provided, and below the valve trays is provided a nozzle for feeding cleaner stripping steam.

* * * * *